(12) United States Patent
Graham

(10) Patent No.: US 11,876,902 B2
(45) Date of Patent: Jan. 16, 2024

(54) MODULES ATTACHABLE TO COMPUTING DEVICES

(71) Applicant: Hewlett-Packard Development Company, L.P., Spring, TX (US)

(72) Inventor: Christoph Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 404 days.

(21) Appl. No.: 17/048,754

(22) PCT Filed: Sep. 28, 2018

(86) PCT No.: PCT/US2018/053313
§ 371 (c)(1),
(2) Date: Oct. 19, 2020

(87) PCT Pub. No.: WO2020/068100
PCT Pub. Date: Apr. 2, 2020

(65) Prior Publication Data
US 2021/0211276 A1 Jul. 8, 2021

(51) Int. Cl.
*H04L 9/08* (2006.01)
*G06F 13/42* (2006.01)

(52) U.S. Cl.
CPC .......... *H04L 9/088* (2013.01); *G06F 13/4282* (2013.01); *G06F 2213/0042* (2013.01)

(58) Field of Classification Search
CPC ............. H04L 9/088; G06F 2213/0042; G06F 13/4282
See application file for complete search history.

(56) References Cited

U.S. PATENT DOCUMENTS

| | | | |
|---|---|---|---|
| 8,175,099 B2 | 5/2012 | Hodges et al. | |
| 9,348,605 B2 | 5/2016 | Drasnin | |
| 9,632,969 B2 | 4/2017 | Hendin et al. | |
| 9,870,066 B2* | 1/2018 | Whitt, III | G06F 1/1626 |
| 9,904,327 B2* | 2/2018 | Whitt, III | H01H 13/785 |
| 9,946,307 B2* | 4/2018 | Lutz, III | G06F 3/0233 |
| 9,959,241 B2* | 5/2018 | Drasnin | G06F 1/1669 |
| 10,013,030 B2* | 7/2018 | Whitt, III | G06F 1/1684 |
| 10,228,770 B2* | 3/2019 | Shaw | G06F 3/023 |
| 10,359,848 B2* | 7/2019 | Winter | G06F 3/03547 |
| 10,578,499 B2* | 3/2020 | Picciotto | G06F 3/016 |
| 10,963,087 B2* | 3/2021 | Shaw | E05D 11/1064 |
| 2006/0211490 A1* | 9/2006 | Falvey | G06F 21/123 463/29 |
| 2010/0115157 A1 | 5/2010 | Hayashida et al. | |
| 2013/0088856 A1 | 4/2013 | Kim et al. | |
| 2013/0304941 A1* | 11/2013 | Drasnin | G06F 13/4068 710/14 |
| 2014/0156875 A1 | 6/2014 | Saunders et al. | |

FOREIGN PATENT DOCUMENTS

| EP | 2504766 A2 * | 10/2012 | ........... G06F 13/385 |
|---|---|---|---|
| EP | 2504766 B1 | 6/2017 | |

* cited by examiner

*Primary Examiner* — Yonas A Bayou
(74) *Attorney, Agent, or Firm* — Quarles & Brady LLP

(57) ABSTRACT

In an example implementation according to aspects of the present disclosure, a method may include discovering, by a computing device, a module attached to the computing device, interrogating the module to determine parameters associated with the module, and updating a human-readable interface to include the parameters.

19 Claims, 3 Drawing Sheets

MODULES ATTACHABLE TO COMPUTING DEVICES

BACKGROUND

Computers are pervasive throughout the world today. While some devices are designed to operate without any additional components, many computers operate by attaching themselves to numerous peripherals or modules, through which users interact with applications on the computer. These peripherals may provide output (e.g., displays, speakers), or receive input from the users (e.g., mice, keyboards, microphones). The peripherals may connect to the computer through a variety of ports, which are supported by hardware, software, firmware, and so forth that allows input received by the peripherals to be interpreted by applications operating on the computer.

DETAILED DESCRIPTION

Examples disclosed herein provide the ability to discover and manage modular devices, such as peripherals, attached to a computing device. As modules are developed that extend a computing device, in order to maintain device specific state and configuration properties that augment or refine the performance of modules with built-in internal intelligence, mechanisms are required to command and control those modules from a host orchestration platform of the computing device, which may be part of the platform BIOS or other intelligent controller, such as the embedded controller. As will be further described, upon interrogating a module to determine parameters associated with it, the computing device updates a human-readable interface, such as F10 Setup, to include such parameters, for example, for end user awareness and configuration associated with the module. As a result of interrogating and inspecting such parameters associated with modules attached to computing devices, in order to update a human-readable interface, there is no need to maintain custom logic and/or single module interfaces, thereby reducing the complexity and diversity in modular devices attached to computing devices.

Figure 1:
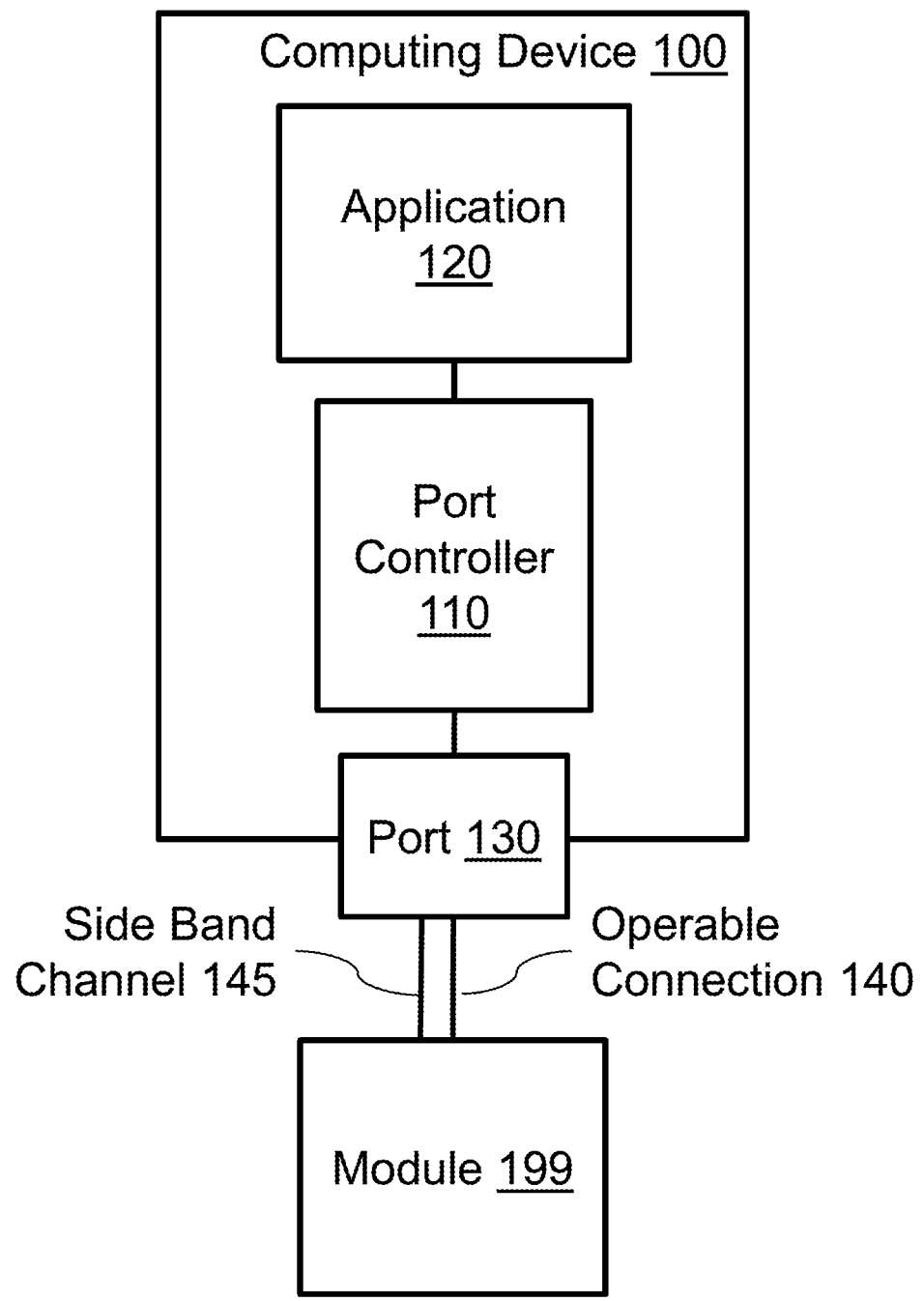
FIG. 1 illustrates a computing device with a port for accommodating various modules, according to an example.

With reference to the figures, FIG. 1 illustrates a computing device 100 with a port 130 for accommodating various modules, according to an example. As will be further described, the computing device 100 may surveil, interrogate capabilities, and inspect and configure module specific configurations on modules attached to the computing device 100, without the need to maintain custom logic and/or single module specific interfaces. As an example, computing device 100 is connected to a module 199 via port 130. Module 199 may be, for example, an input device designed to receive input from a user and provide that input to computing device 100, such as a mouse, keyboard, keypad, microphone, and so forth. In other examples, module 199 may be an output device, such as a monitor. The connection between port 130 and module 199 may form an operable connection 140 that allows signals to be passed between computing device 100 and module 199. Operable connection 140 may involve, for example, hardware, software, firmware, cable(s), pin(s), and so forth.

Operable connection 140 may also include channels, such as side-band channel 145, that are not directly associated with transmitting content between computing device 100, module 199, and so forth. The side-band channels may be associated with, for example, power delivery to module 199, control of certain aspects of module 199, and so forth. As used herein, a side-band channel is a channel associated with a connection protocol that is not used for primary data communication over that protocol. For example, a Universal Serial Bus (USB) type C connector has a power delivery channel for providing power to modules 199. The power delivery channel is not typically allocated for the transmission of data between modules 199 and device to which the modules are connected, and is instead used for providing power to module 199.

While side-band channels are often not used for the transmission of data, the side-band channel may be usable for communication by varying aspects of the channel assuming a device and/or module are listening for such variances. For example, the power delivery channel may be able to vary current, voltage, resistance, and so forth to effectively allow conveyance of information between two participating devices. Consequently, a custom protocol relying on the side-band channel may be usable by computing device 100 and module 199 in a way that allows private communications to occur without otherwise impacting the communications between computing device 100 and module 199. The custom protocol may be, for example, a specialized protocol, a proprietary protocol, and so forth, that may be designed with a specific function in mind. Custom protocols may, for example, be usable by a device maker to make it difficult for malicious actors to detect certain communications between computing device 100 and module 199.

In some examples, computing device 100 may also include an interface module (not shown). The interface module may translate communications between port controller 110 and application 120. The interface module may be made up of an interface controller and a controller interface. The interface controller may store signals received from port controller 110 in a memory of computing device 100. The interface controller may also control port controller 110 to transmit signals to module 199 based on data retrieved from the system memory.

The controller interface may serve as an application programming interface between application 120 and the interface controller. This may be achieved by translating instructions retrieved from the application 120 into commands that comply with a protocol associated with the custom communications and store them in the memory of computing device 100. The controller interface may also translate responses received from module 199 to a format usable by application 120. In these examples, module 199, port controller 110, application 120, the controller interface, and the application 120 may all be aware of the side-band channel and the custom communications.

In some examples computing device 100 may also include a verification module (not shown). The verification module may authenticate application 120, module 199, and so forth, prior to port controller 110 routing communications between the application 120 and the module 199. Thus, the verification module may prevent use of side-band channel 145 and certain features associated with side-band channel 145 when the verification module is unable to authenticate certain components.

As an example, once module 199 is attached to the computing device 100 via port 130, the computing device 100 may detect support for routing communications to the module 199 via the custom communication protocol described above, which may operate over the side-band channel 145 of the operable connection 140 between the computing device 100 and the module 199. As an example, the operable connection 140 is a USB type C connection, where the side-band channel 145 is a power delivery channel of the USB type C connection. However, the operable connection 140 is not limited to a USB type C connection, but could also be other bus/connector types that, for example, support an auxiliary or side communication channel.

Upon discovering the module 199, application 120, using the custom communications, may interrogate the module 199 to determine parameters associated with the module 199. As an example, in addition to interrogating the module 199 upon discovery of the attachment of the module 199, interrogation may also take place when the computing device 100 is booted. In addition, interrogation can be initiated when either the module 199 or computing device 100 dynamically signals changes in its configuration, for example, through custom events.

As an example, the application 120 may interrogate the module 199 using an interrogation protocol based on a USB device discovery, particularly if the operable connection 140 is a USB type C connection. Interrogating the module 199 may include discovering and proxying capabilities from the attached module 199, by requesting capability and configuration information from the module 199 directly. As an example, the parameters include stateful information, such as the binding of encryption keys, to ensure communication between the computing device 100 and the module 199 cannot be compromised. As a result, the computing device 100 may use the encryption key to ensure secure communications between the computing device 100 and the module 199.

Upon interrogating the module 199 to determine parameters associated with the module 199, application 120 may update a human-readable interface, such as F10 Setup, to include such parameters, particularly for end user awareness and configuration. As certain parameters may be configurable, including those parameters in the human-readable interface allow for users to adjust settings associated with the module 199 in the human-readable interface itself, and not in an interface dedicated just for the module 199 (e.g., single module specific interface). As a number of modules may be attached to the computing device 100, updating the human-readable interface (e.g., F10 Setup) to include parameters associated with each module attached to the computing device 100 reduces the complexity and diversity in the modules attached to the computing device 100. For example, settings associated with each module attached to the computing device 100 may be adjusted from a single human-readable interface, rather than module specific interfaces dedicated for each module. As a result, additional platform risks associated with the interoperation of third-party and potentially untrustable code may be avoided.

As an example, in addition to the computing device 100 interrogating the module 199 to determine parameters associated with the module 199, the module 199 may also interrogate the computing device 100 to determine configuration options that may be applicable to the module 199. As a result, those configuration options may be available to be modified on the module 199.

Figure 2:
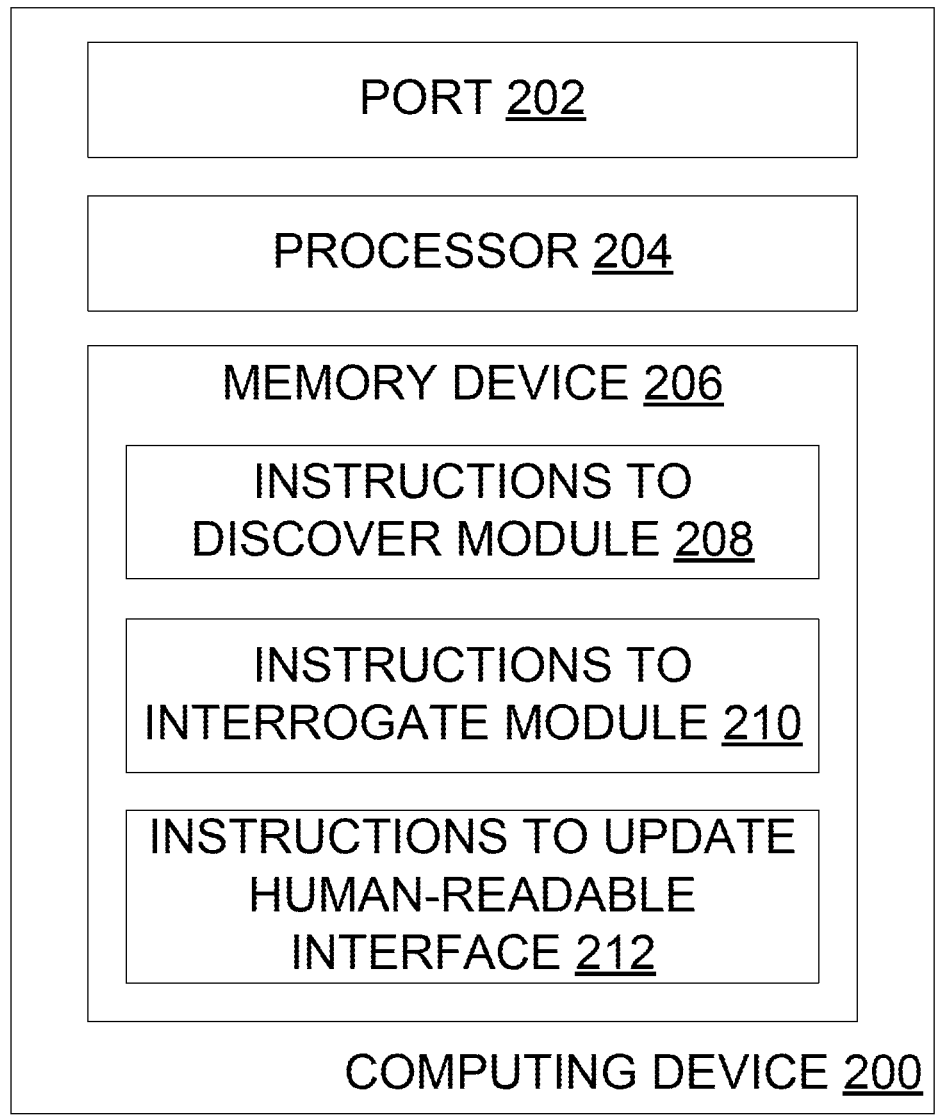
FIG. 2 illustrates another computing device with a port for accommodating various modules, according to an example.

FIG. 2 illustrates a computing device 200 with a port 202 for accommodating various modules, according to an example. The computing device 200 depicts a processor 204 and a memory device 206 and, as an example of the computing device 200 performing its operations, the memory device 206 may include instructions 208-212 that are executable by the processor 204. Thus, memory device 206 can be said to store program instructions that, when executed by processor 204, implement the components of the computing device 200. The executable program instructions stored in the memory device 206 include, as an example, instructions to discover module (208), instructions to interrogate module (210), and instructions to update a human-readable interface (212).

Instructions to discover module (208) represent program instructions that when executed by the processor 204 cause the computing device 200 to discover a module attached to the computing device 200 via port 202. As an example, once a module is attached to the computing device 200 via port 202, the computing device 200 may detect support for routing communications to the module via, for example, the custom communication protocol described above, which may operate over a side-band channel of an operable connection between the computing device 200 and the module.

Instructions to interrogate module (210) represent program instructions that when executed by the processor 204 cause the computing device 200 to interrogate the module to determine parameters associated with the module. Interrogating the module may include discovering and proxying capabilities from the attached module, for example, requesting capability and configuration information from the module directly.

Instructions to update a human-readable interface (212) represent program instructions that when executed by the processor 204 cause the computing device 200 to update a human-readable interface (e.g., F10 Setup) to include the parameters associated with the module. As certain parameters may be configurable, including those parameters in the human-readable interface allow for users to adjust settings associated with the module in the human-readable interface itself, and not in an interface dedicated just for the module.

Memory device 206 represents generally any number of memory components capable of storing instructions that can be executed by processor 204. Memory device 206 is non-transitory in the sense that it does not encompass a transitory signal but instead is made up of at least one memory component configured to store the relevant instructions. As a result, the memory device 206 may be a non-transitory computer-readable storage medium. Memory device 206 may be implemented in a single device or distributed across devices. Likewise, processor 204 represents any number of processors capable of executing instructions stored by memory device 206. Processor 204 may be integrated in a single device or distributed across devices. Further, memory device 206 may be fully or partially integrated in the same device as processor 204, or it may be separate but accessible to that device and processor 204.

In one example, the program instructions 208-212 can be part of an installation package that when installed can be executed by processor 204 to implement the components of the computing device 200. In this case, memory device 206 may be a portable medium such as a CD, DVD, or flash drive or a memory maintained by a server from which the installation package can be downloaded and installed. In another example, the program instructions may be part of an application or applications already installed (e.g., application 120). Here, memory device 206 can include integrated memory such as a hard drive, solid state drive, or the like.

Figure 3:
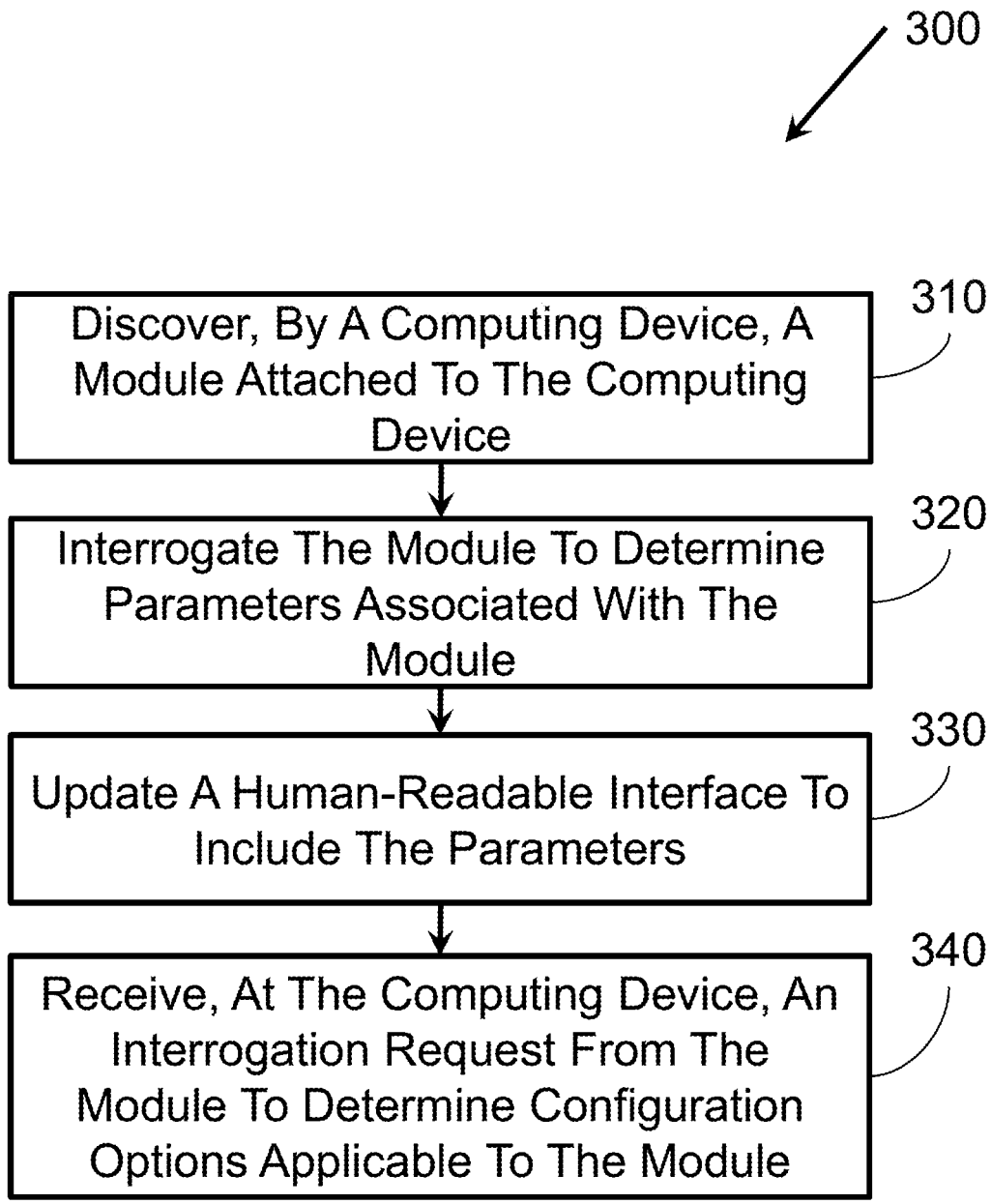
FIG. 3 is a flow diagram in accordance with an example of the present disclosure.

FIG. 3 is a flow diagram 300 of steps taken by a computing device to implement a method for discovering and managing modules attached to the computing device, according to an example. Method 300 may be performed by, for example, an application operating on the computing device (e.g., application 120). Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 310, the computing device discovers a module attached to the computing device. As an example, discovering the module includes detecting support for routing communications to the module via a custom communication protocol that operates over a side-band channel of an operable connection between the computing device and the module. The operable connection may be a USB type C connection, and the side-band channel may be a power delivery channel of the USB type C connection. However, the operable connection 140 is not limited to a USB type C connection, but could also be other bus/connector types that, for example, support an auxiliary or side communication channel.

At 320, the computing device interrogates the module to determine parameters associated with the module. As an example, the computing device interrogates the module using an interrogation protocol based on a USB device discovery. As an example, in addition to interrogating the module upon discovery of the attachment of the module, interrogation may also take place when the computing device is booted. In addition, interrogation can be initiated when either the module or computing device dynamically signals changes in its configuration, for example, through custom events.

At 330, the computing device updates a human-readable interface (e.g., F10 Setup) to include the parameters associated with the module. As an example, the parameters are configurable, and updating the human-readable interface comprises including the parameters for adjusting settings associated with the module. In addition, the parameters may include an encryption key, and the computing device may utilize the encryption key to ensure secure communications between the computing device and the module. At 340, the computing device may receive an interrogation request from the module as well, in order to determine configuration options applicable to the module.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A method comprising:
   discovering, by a computing device, one or more modules attached to the computing device;
   authenticating the one or more modules via a verification module;
   interrogating the one or more modules to determine parameters associated with each of the one or more modules;
   updating a human-readable interface to include the parameters associated with each of the one or more modules; and
   receiving, at the computing device, an interrogation request from the one or more modules to determine configuration options applicable to the one or more modules.

2. The method of claim 1, wherein the parameters are configurable, and updating the human-readable interface comprises including the parameters for adjusting settings associated with the one or more modules.

3. The method of claim 1, wherein the parameters comprise an encryption key.

4. The method of claim 3, comprising utilizing the encryption key to ensure secure communications between the computing device and the one or more modules.

5. The method of claim 1, wherein discovering the one or more modules comprises detecting support for routing communications to the one or more modules via a custom communication protocol that operates over a side-band channel of an operable connection between the computing device and the one or more modules.

6. The method of claim 5, where the operable connection is a Universal Serial Bus (USB) type C connection, and where the side-band channel is a power delivery channel of the USB type C connection.

7. The method of claim 6, wherein interrogating the one or more modules comprises using an interrogation protocol based on a USB device discovery.

8. The method of claim 1, further comprising:
   adjusting the one or more parameters associated with the one or more modules from within the human-readable interface.

9. The method of claim 8, wherein the human-readable interface is generic to each of the one or more modules such that each of the one or more modules are adjustable from the single human-readable interface.

10. The method of claim 1, wherein the computing device includes a display configured to present the human-readable interface to a user.

11. The method of claim 1, further comprising:
    preventing communication between the one or more modules and the computing device via a side-band channel when the verification module is unable to authenticate the one or more modules.

12. A computing device comprising:
a port controller to route custom communications to one or more modules over an operable connection between the computing device and the one or more modules via one or more ports, where the custom communications are routed to the one or more modules over a side-band channel of the operable connection between the computing device and the one or more modules; and
an application, using the custom communications, to:
authenticate the one or more modules via a verification module;
interrogate the one or more modules to determine parameters associated with each of the one or more modules; and
update a human-readable interface to include the parameters associated with each of the one or more modules.

13. The computing device of claim 12, where the one or more ports are Universal Serial Bus (USB) type C connections and where the side-band channel is a USB type C power delivery channel.

14. The computing device of claim 12, wherein the parameters comprise an encryption key, and the application, using the custom communications, is to utilize the encryption key to ensure secure communications between the computing device and the one or more modules.

15. The computing device of claim 12, further comprising an interface module to translate communications between the port controller and the application.

16. The computing device of claim 15, where the interface module comprises:
an interface controller to store signals received from the port controller in a memory of the computing device and to control the interface controller to transmit signals based on data retrieved from the memory; and
a controller interface to serve as an application programming interface between the application and the interface controller by translating instructions retrieved from the application into commands that comply with a protocol associated with the custom communications, and to translate responses received from the module to a format usable by the application.

17. A non-transitory computer-readable storage medium comprising program instructions which, when executed by a processor, cause the processor to:
discover one or more modules attached to a computing device;
authenticate the one or more modules via a verification module;
interrogate the one or more modules to determine parameters associated with each of the one or more modules; and
update a human-readable interface to include the parameters associated with each of the one or more modules.

18. The non-transitory computer-readable storage medium of claim 17, wherein the program instructions causing the processor to discover the one or more modules comprises program instructions causing the processor to detect support for routing communications to the one or more modules via a custom communication protocol that operates over a side-band channel of an operable connection between the computing device and the one or more modules.

19. The non-transitory computer-readable storage medium of claim 18, where the operable connection is a Universal Serial Bus (USB) type C connection, and where the side-band channel is a power delivery channel of the USB type C connection.

* * * * *